Dec. 13, 1932.  S. Z. DE FERRANTI  1,891,144

ALTERNATING CURRENT ELECTRICITY METER

Filed Oct. 28, 1929  4 Sheets-Sheet 1

S. Z. de Ferranti
INVENTOR

By Marks & Clerk
Attys.

Dec. 13, 1932.          S. Z. DE FERRANTI          1,891,144
ALTERNATING CURRENT ELECTRICITY METER
Filed Oct. 28, 1929        4 Sheets-Sheet 3

S. Z. de Ferranti
INVENTOR

By: Marks & Clerk
ATTYS.

Dec. 13, 1932.  S. Z. DE FERRANTI  1,891,144
ALTERNATING CURRENT ELECTRICITY METER
Filed Oct. 28, 1929  4 Sheets-Sheet 4

S. Z. de Ferranti
INVENTOR

By Marks & Clerk
Attys.

Patented Dec. 13, 1932                                                    1,891,144

UNITED STATES PATENT OFFICE

SEBASTIAN ZIANI de FERRANTI, OF HOLLINWOOD, ENGLAND, ASSIGNOR TO FERRANTI INC., OF NEW YORK, N. Y.

ALTERNATING CURRENT ELECTRICITY METER

Application filed October 28, 1929, Serial No. 403,031, and in Great Britain November 15, 1928.

This invention relates to A. C. electricity meters of the type wherein rotation of the rotor is produced by the interaction of series and shunt fields with eddy currents produced in the rotor.

The invention has for its object to provide improved meters and meter movements.

The invention consists mainly in an A. C. electricity meter of the type including a rotor, series and shunt electromagnets and braking means contained in a casing, rotation of the rotor being produced by interaction of series and shunt circuit electromagnetic fields with eddy currents produced in said rotor characterized by the provision of a rigid sub-frame supported by a three-point suspension on the meter casing and carrying both series and shunt magnet cores, the said casing in plan view approximating to the smallest square which will contain said rotor.

Referring to the accompanying diagrammatic drawings:—

Figure 2 is a side view thereof.

Figures 15 and 16 are side, and inverted plan views respectively of a modification.

Figure 1:
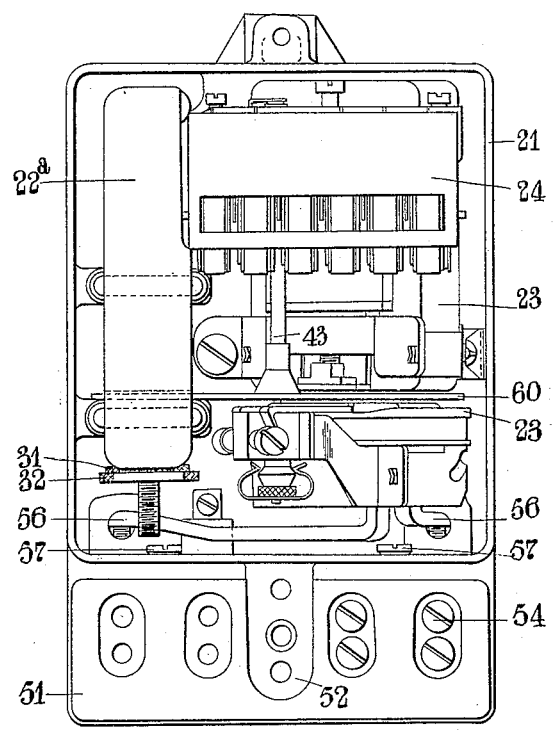
Figure 1 is a front elevation with cover removed of a convenient construction in accordance with the present invention.
Figure 3:
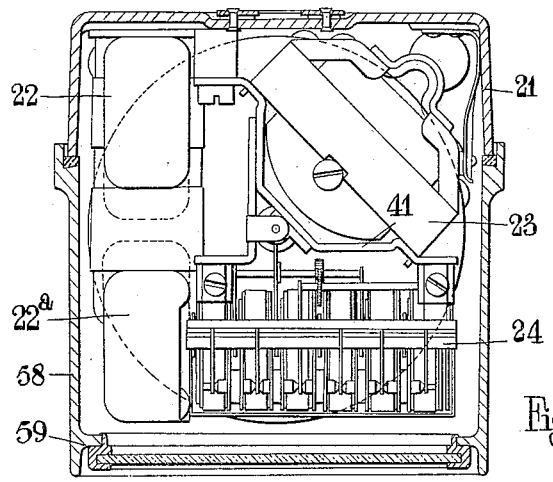
Figure 3 is a plan view thereof.

In carrying the invention into effect in one convenient form by way of example illustrated in the accompanying drawings as applied to a meter intended for single phase use, we provide a shallow case 21, Figures 1, 2 and 3, preferably of cast iron which is chilled in order to render difficult drilling thereof. This casing is substantially square in front elevation and on its back inner surface we attach braking magnets 22 and 22a and the electromagnet unit 23 which latter in turn supports the index train 24.

As regards the braking magnets we employ two 22, 22a each approximately C shape, and mount these, one behind the other. The aforesaid magnets are spaced by suitable non-magnetic supports 25 and 26 (Figure 5).

Figure 5:
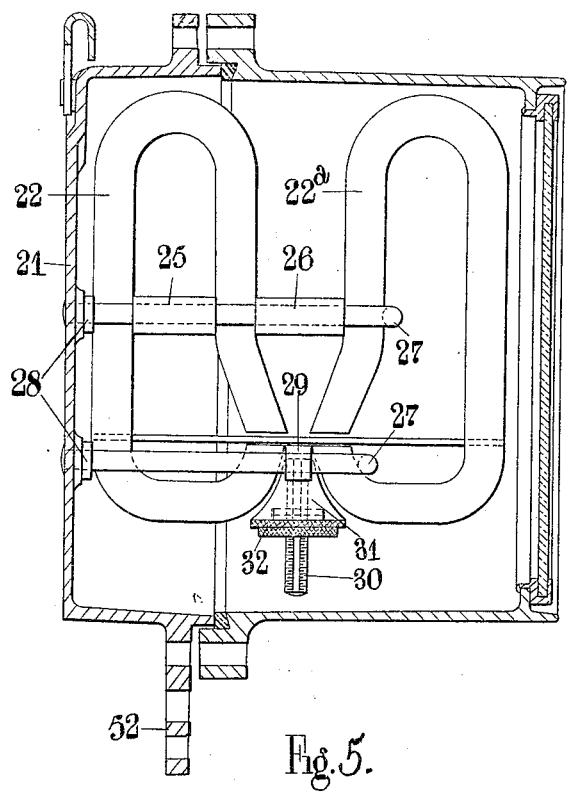
Figure 5 is a side view showing said detail.

This unit is now clamped together by encircling non-magnetic straps 27, Figure 5, which fit into suitably spaced notches in the side of the magnets and in turn the whole is riveted to the case back 21 and supported from the case back by means of non-magnetic packing pieces 28.

Attached to a lower spacing support 29 and extending downwards vertically is a screwed pillar 30 which carries a block of magnetizable material 31 which is capable of adjustment in a vertical direction to and from the lower pole tips of the braking magnets. This adjustment can be locked in any position by means of locking nut 32, Figure 5, which is also made of magnetizable material.

In another example illustrated in Figures 15 and 16, we drill two holes through each of two limbs of each magnet 22, 22a, the holes in the outermost (i. e. after erection) limbs being of slightly smaller diameter than the other two pairs of holes, through which latter the pillars 27a pass with driving fit. The pillars are shouldered at each end and one end of each is adapted to enter a hole in the back wall of the casing to which it is riveted in a single operation, which also rivets the upper magnet to the remote ends of the pillars. On one of the pillars and between the two magnets we provide a fork-shaped piece 65, Figures 15 and 16, one limb of which is furnished with a screw 66 locking the fork rigidly upon the pillar 27a. Between the limbs of the fork is provided a toothed wheel or toothed sector 67 rigidly attached to or integral with an arm of magnetizable material, or carrying a block of magnetizable material 68.

Carried in the fork between its limbs is a screw 69 which engages the teeth in the worm wheel or toothed sector and a locking screw 70 is provided in the fork by which a block may be forced against the aforesaid screw, thus firmly locking it together with the worm wheel or toothed sector to the pillar support after the desired position of adjustment has been reached by rotating the aforesaid screw.

Figure 6:
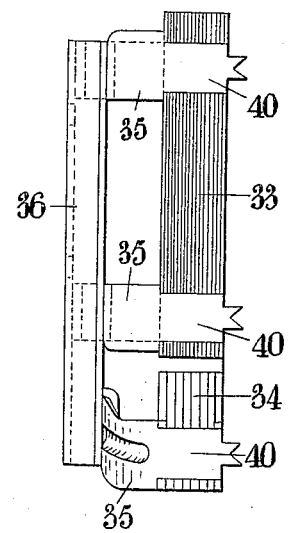
Figures 6 and 7 are cross sectional and rear views respectively of a detail.
Figure 7:
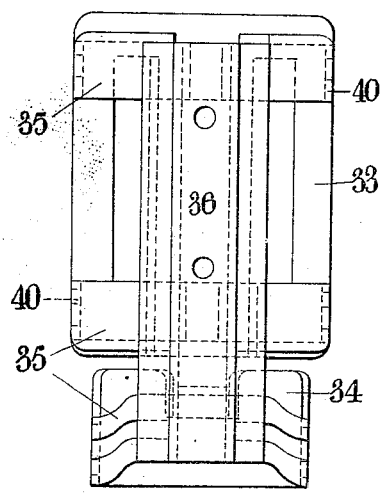
Figure 13:
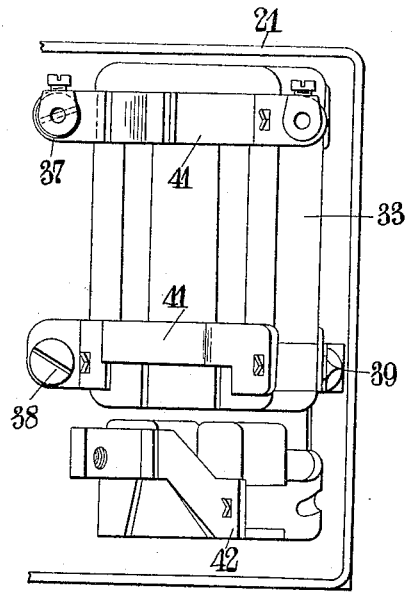
Figures 13 and 14 show front and plan views respectively of the magnet cores and sub-frame as mounted in the meter casing.
Figure 14:
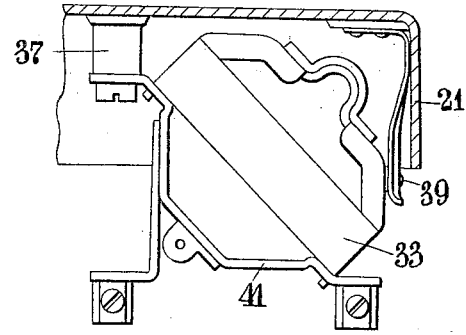

As regards the driving unit (see Figures 6 and 7) this comprises a shunt magnet core 33 and a series magnet core 34 disposed relatively in customary fashion. The magnet cores, however, are each mounted upon brackets of channelled strip metal 35 which is rigidly secured, say, by welding to a rigid rear frame member 36, this latter, together with the brackets, constituting a sub-frame and being itself secured to the meter case on the three-point suspension, 37, 38 and 39 (Figures 13 and 14).

The supporting brackets are furnished with tongues 40 (Figures 6 and 7) which enter appropriately shaped notches in the shunt and series core laminæ and these tongues at their extremities are bifurcated and the ends spread within appropriate holes formed in cover plates 41, 42, (Figures 13 and 14) or bracket members. Two of these last-named bracket members 41, 42 serve as pivot supports for the rotor spindle 43 (Figure 1).

It will be appreciated that by attaching the laminæ in the manner described above the necessity for piercing them for rivets, screws, etc., is avoided.

Whatever magnetic circuit is completed by the tongues and brackets is disposed outside the working magnetic system. Thus a minimum of disturbance of the normal magnetic field path is entailed and quadrature between shunt and series working fluxes is more easily obtained. One of the brackets 41 referred to above serves also to support the index train 24.

The mounting of the sub-frame within the case is such that the rear member of the subframe occupies the corner of the casing, while the rotor spindle is disposed nearly on the centre line of the casing. The arrangement is such, however, that when magnets, driving system, and counter train are erected the space occupied in plan view approximates to the smallest square which will contain the rotor disc and yet the rotor disc with its spindle may be withdrawn laterally by merely detaching the index train 24, (i. e. after releasing the spindle bearing pivots).

Figures 8, 9, 10:
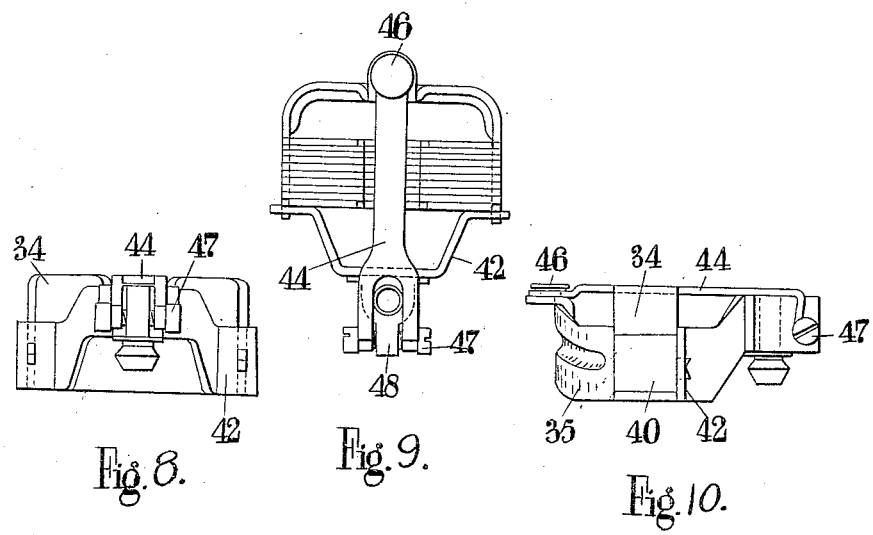
Figures 8, 9 and 10 show front, plan and side views respectively of another detail.

As regards the low load torque adjustment this is effected by means of a magnetizable member 44 (Figures 8, 9 and 10) which is forked to permit the rotor spindle to reach the bottom jewel support. The ends of this forked member are turned over and connected to adjusting screw 47. The bottom jewel support 48 is extended to carry this adjustment screw.

Figure 11:
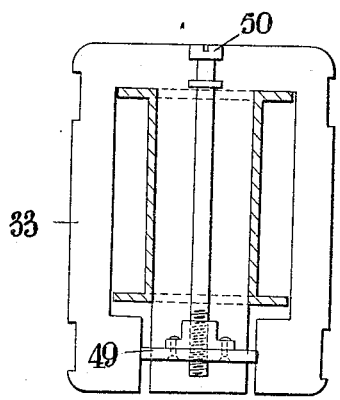
Figures 11 and 12 show front and plan views respectively of a further detail.
Figure 12:
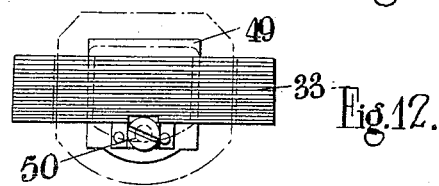

As regards the inductive load adjustment (Figures 11 and 12) this is provided by a ring of copper 49 encircling the centre limb of the shunt magnet core, which ring may be drawn up or lowered by means of a screw 50 which can be operated from the top of the meter mechanism, and which passes between the shunt coil bobbin and the centre limb of the shunt magnet core.

The index train 24 (Figures 1 and 3) when erected occupies a position such that its longitudinal axis lies at right angles to the plane containing the straps of the braking magnets.

Figure 4:
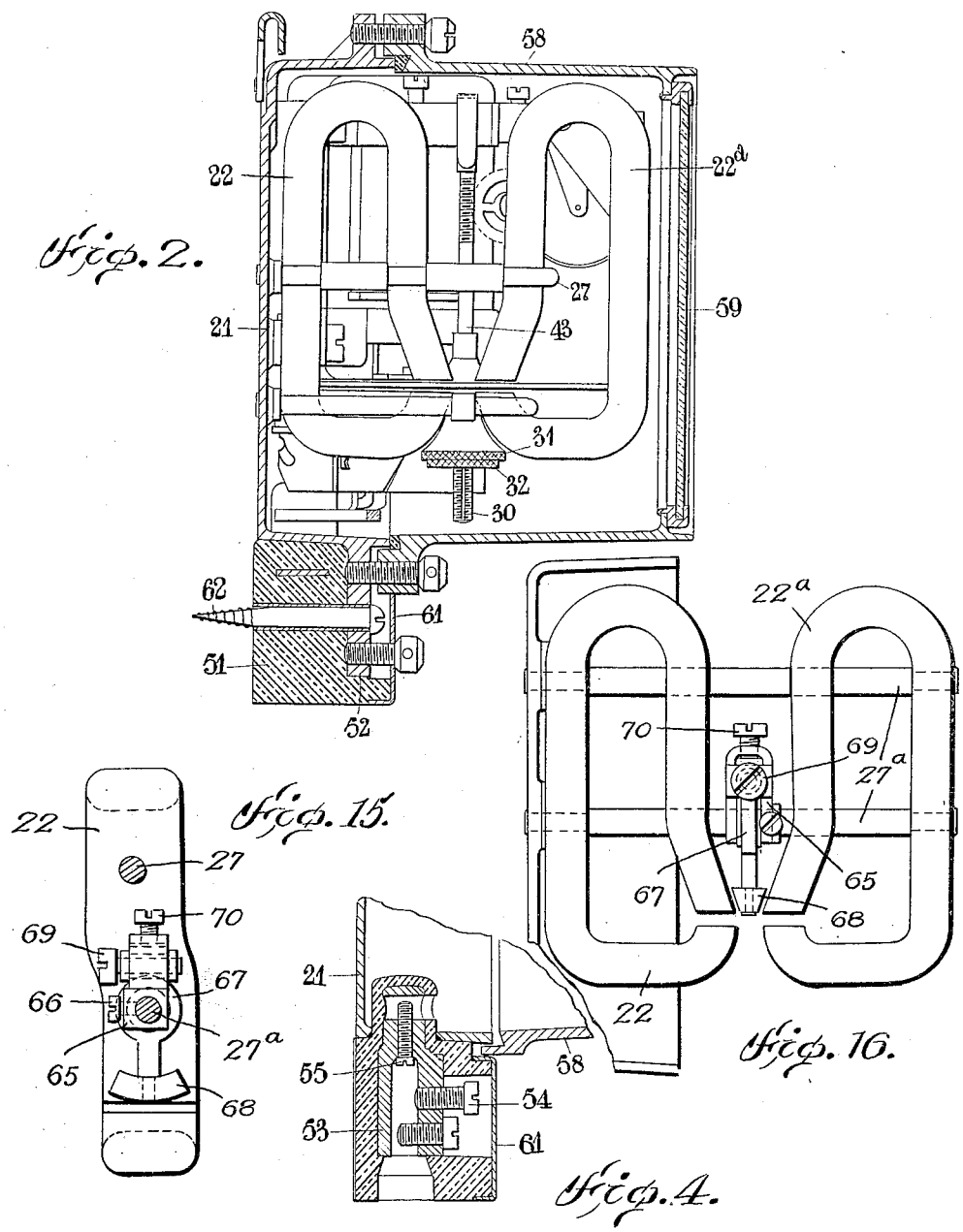
Figure 4 is a cross section of a detail.

A terminal block 51 (Figures 1 and 2) is attached to the exterior of the casing by means of a lug 52 extending from and integral with the latter, the terminal block 51 being formed of moulded insulating material in which are embedded the necessary connecting sockets 53, Figure 4, with their binding screws 54.

The sockets 53, covered with insulating material, enter holes in the casing and internal screws 55 serve to attach the leads from the meter coils 56 (Figure 1) to the blocks.

These screws are applied through the socket holes in which the external leads are ultimately inserted and clamp the coil leads which enter lateral holes near the inner ends of the blocks.

The screws 54 (Figure 4) applied laterally serve to attach external leads to the blocks.

Screws 57 (Figure 1) fitted through holes in the block serve to clamp the terminal block firmly against the lower face of the case.

A cover 58 (Figures 2 and 3) is provided for co-operating with the case, the cover preferably being formed of non-magnetic undrillable material and furnished with a suitable window 59 through which the index train can be viewed.

The mechanism of the meter in the example described above is so placed as to constitute an extremely compact assemblage, the overall dimensions of which exceed the diameter of the disc and the height of the shunt and series core assemblage to a very slight degree, and yet the rotor disc 60 (Figure 1) with its spindle 43 may be removed without disturbing any part of the mechanism, apart from the prior removal of the index train 24.

A pressed steel cover 61 (Figures 2 and 4) is provided which covers the binding screws 54 and meter fixing screw 62 and shields the terminals from outside interference.

I claim:

1. An A. C. electricity meter including a rotor, series and shunt electromagnets, braking means for said rotor and supporting members for said electromagnet cores comprising tongues having bifurcated extremities and occupying notches in the core laminæ and pierced cover plates clamped by said bifurcated ends.

2. An A. C. electricity meter as claimed in claim 1 having a rigid sub-frame supported by a three-point suspension on a casing containing the rotor, electromagnets and braking means, said sub-frame serving to carry both series and shunt magnet cores and said casing in plan view approximating to the smallest square which will contain said rotor.

3. An A. C. electricity meter as claimed in claim 1 including a casing for said rotor, electromagnets and braking means, and a welded channel strip sub-frame supported by a three-point suspension on the meter casing and carrying both series and shunt magnet cores, the said casing in plan view approximating to the smallest square which will contain said rotor.

4. An A. C. electricity meter as claimed in claim 1 wherein said braking means comprise two separate braking magnets, two non-magnetic supporting straps serving to secure said magnets to a casing containing the meter mechanism.

5. An A. C. electricity meter as claimed in claim 1 wherein said braking means comprise two separate braking magnets between adjacent limbs of which is mounted an adjustable iron armature capable of being moved into any desired position from between said braking magnets to outside said braking magnets.

6. An A. C. electricity meter as claimed in claim 1 including a sub-frame carrying said series and shunt electromagnets and a magnetizable member pivoted on said sub-frame and furnished with means for rocking the member.

In testimony whereof I have signed my name of this specification.

SEBASTIAN ZIANI DE FERRANTI.